(12) United States Patent
Friederich et al.

(10) Patent No.: US 12,311,852 B2
(45) Date of Patent: May 27, 2025

(54) METHOD OF A VEHICLE AND OF A NETWORK SERVER FOR THE MAINTENANCE OF VEHICLE COMPONENTS

(71) Applicant: Volkswagen Aktiengesellschaft, Wolfsburg (DE)

(72) Inventors: Marco Friederich, Braunschweig (DE); Martin Döring, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 326 days.

(21) Appl. No.: 17/630,084

(22) PCT Filed: Jul. 23, 2020

(86) PCT No.: PCT/EP2020/070752
§ 371 (c)(1),
(2) Date: Jan. 25, 2022

(87) PCT Pub. No.: WO2021/018712
PCT Pub. Date: Feb. 4, 2021

(65) Prior Publication Data
US 2022/0274550 A1   Sep. 1, 2022

(30) Foreign Application Priority Data
Jul. 26, 2019   (DE) ..................... 10 2019 211 155.6

(51) Int. Cl.
*B60R 16/023*   (2006.01)
*G07C 5/00*   (2006.01)
*G07C 5/08*   (2006.01)

(52) U.S. Cl.
CPC .......... *B60R 16/0234* (2013.01); *G07C 5/006* (2013.01); *G07C 5/008* (2013.01); *G07C 5/0808* (2013.01)

(58) Field of Classification Search
CPC .... B60R 16/0234; G07C 5/006; G07C 5/008; G07C 5/0808
(Continued)

(56) References Cited

U.S. PATENT DOCUMENTS

| | | | |
|---|---|---|---|
| 2003/0204777 A1 | 10/2003 | Kojori | 714/14 |
| 2005/0038581 A1 | 2/2005 | Kapolka et al. | 701/31.4 |

(Continued)

FOREIGN PATENT DOCUMENTS

| | | |
|---|---|---|
| CN | 102854369 A | 1/2013 |
| CN | 107176038 A | 9/2017 |

(Continued)

OTHER PUBLICATIONS

Chinese Office Action, Application No. 202080053921.8, 10 pages.
(Continued)

*Primary Examiner* — Anne Marie Antonucci
*Assistant Examiner* — Luis G Del Valle
(74) *Attorney, Agent, or Firm* — Slayden Grubert Beard PLLC

(57) ABSTRACT

A method for the maintenance of vehicle components is disclosed. The operating points of a plurality of vehicle components are captured over a first time period $\Delta t_1$ and first developments of the plurality of operating points over time in the first time period $\Delta t1$ are determined. The operating points of the plurality of vehicle components are captured over a second time period $\Delta t_2$ different from the first time period $\Delta t_1$ and second developments of the plurality of operating points over time in the second time period $\Delta t_2$ are determined. By comparing the first developments and the (Continued)

second developments of the operating points of the plurality of vehicle components over time, it is determined whether the second development of the operating point of a vehicle component over time deviates from the first development of the operating point of said vehicle component over time by more than a predefined limit value.

15 Claims, 2 Drawing Sheets

(58) Field of Classification Search
USPC .......................................................... 701/29.4
See application file for complete search history.

(56) References Cited

U.S. PATENT DOCUMENTS

| | | | |
|---|---|---|---|
| 2013/0218400 A1 | 8/2013 | Knoop et al. ................. 701/31.4 |
| 2014/0067190 A1* | 3/2014 | Giustiniano .......... G01M 17/04 |
| | | | 701/29.1 |
| 2014/0103937 A1 | 4/2014 | Khan et al. .................... 324/509 |
| 2016/0001657 A1 | 1/2016 | Koller et al. ................. 307/10.1 |
| 2017/0240049 A1* | 8/2017 | Ebert ......................... B60L 1/00 |
| 2017/0259687 A1 | 9/2017 | Chikkannanavar et al. |
| 2017/0282819 A1 | 10/2017 | Emrani |
| 2018/0029474 A1* | 2/2018 | Berels ..................... B60L 58/15 |
| 2018/0286143 A1* | 10/2018 | Deshmukh ............. G07C 5/006 |
| 2018/0329406 A1 | 11/2018 | Bharti et al. |
| 2019/0055015 A1* | 2/2019 | Allard .................... B64C 39/024 |
| 2019/0066398 A1* | 2/2019 | Sankavaram .......... G07C 5/085 |
| 2019/0130669 A1 | 5/2019 | Boggio |
| 2020/0380794 A1* | 12/2020 | Lake .................... G07C 5/0816 |
| 2021/0287460 A1* | 9/2021 | Aono ..................... G07C 5/008 |

FOREIGN PATENT DOCUMENTS

| | | | |
|---|---|---|---|
| CN | 107264443 A | 10/2017 | |
| DE | 102013203661 A1 | 9/2014 | ............. B60L 11/18 |
| DE | 102014222878 A1 | 5/2016 | ............. B60R 16/03 |
| DE | 102016224193 A1 | 6/2018 | ............. B60R 16/02 |
| DE | 102017107284 A1 | 10/2018 | ............. B60R 16/03 |
| DE | 102019211155 A1 | 1/2021 | ............. B60R 16/02 |
| EP | 3690827 A1 | 8/2020 | ............. B60W 50/04 |
| KR | 101361285 B1 | 2/2014 | |
| WO | 2004/024531 A1 | 3/2004 | ............. B61L 15/00 |
| WO | 2021/018712 A1 | 2/2021 | ............. B60R 16/03 |

OTHER PUBLICATIONS

German Office Action, Application No. 102019211155.6, 8 pages.
International Search Report and Written Opinion, Application No. PCT/EP2020/070752, 10 pages.

* cited by examiner

METHOD OF A VEHICLE AND OF A NETWORK SERVER FOR THE MAINTENANCE OF VEHICLE COMPONENTS

CROSS-REFERENCE TO RELATED APPLICATIONS

This application claims priority to German Patent Application No. DE 10 2019 211 155.6, filed Jul. 26, 2019 with the German Patent and Trademark Office. The contents of the aforesaid patent application are incorporated herein for all purposes.

TECHNICAL FIELD

The invention relates to a method of a vehicle for the maintenance of vehicle components, especially for maintenance of vehicle components based on a monitoring of the operating points of a plurality of vehicle components. The invention further relates to a motor vehicle and to a network server configured to participate in the method according to the invention.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern vehicles have a plurality of electronically controlled vehicle components, which are regulated and monitored on a regular basis by individual control devices. The monitoring of the components is intended primarily to detect and prevent unsafe conditions in the components. The monitoring of the vehicle components therefore presupposes a definition of the unsafe operating states and of system values that indicate these conditions, as well as the measurement of these system values on a regular basis. The system values are generally measured by the individual control devices of self-diagnosing vehicle components.

Therefore, each of the individual control devices requires its own measurement technology for capturing the relevant system values and, as the case may be, for further processing them.

Similarly, data connections to a central control unit or to a communication module must be set up with a bandwidth that reliably ensures the transmission of a plurality of system values. Disadvantageously, both result in higher costs and larger required installation space in the overall vehicle.

Moreover, the properties of the vehicle components may change during operation of the vehicle, such as due to age deterioration-related material changes. Additionally, the conditions in which the vehicle and vehicle components are used may change. The monitoring of the vehicle components, based on predefined limit values, may therefore result in incorrect diagnosis of unsafe operating states.

WO 2004/024531 A1 describes a method according to which a vehicle has both sensors for generating component data for monitored vehicle components, as well as sensors for generating environmental data. Both the component data as well as the environmental data are further processed.

This solution known from the prior art requires further sensors for monitoring environmental parameters, in addition to the sensors for the vehicle components to be monitored. This requires additional installation space and incurs costs.

SUMMARY

A need exists for providing an alternative method for maintenance of vehicle components, according to which the installation space requirement and overall vehicle costs may be reduced.

The need is addressed by the subject matter of the independent claims. Embodiments of the invention are described in the dependent claims, the following description, and the drawings.

DESCRIPTION

Figure 1:
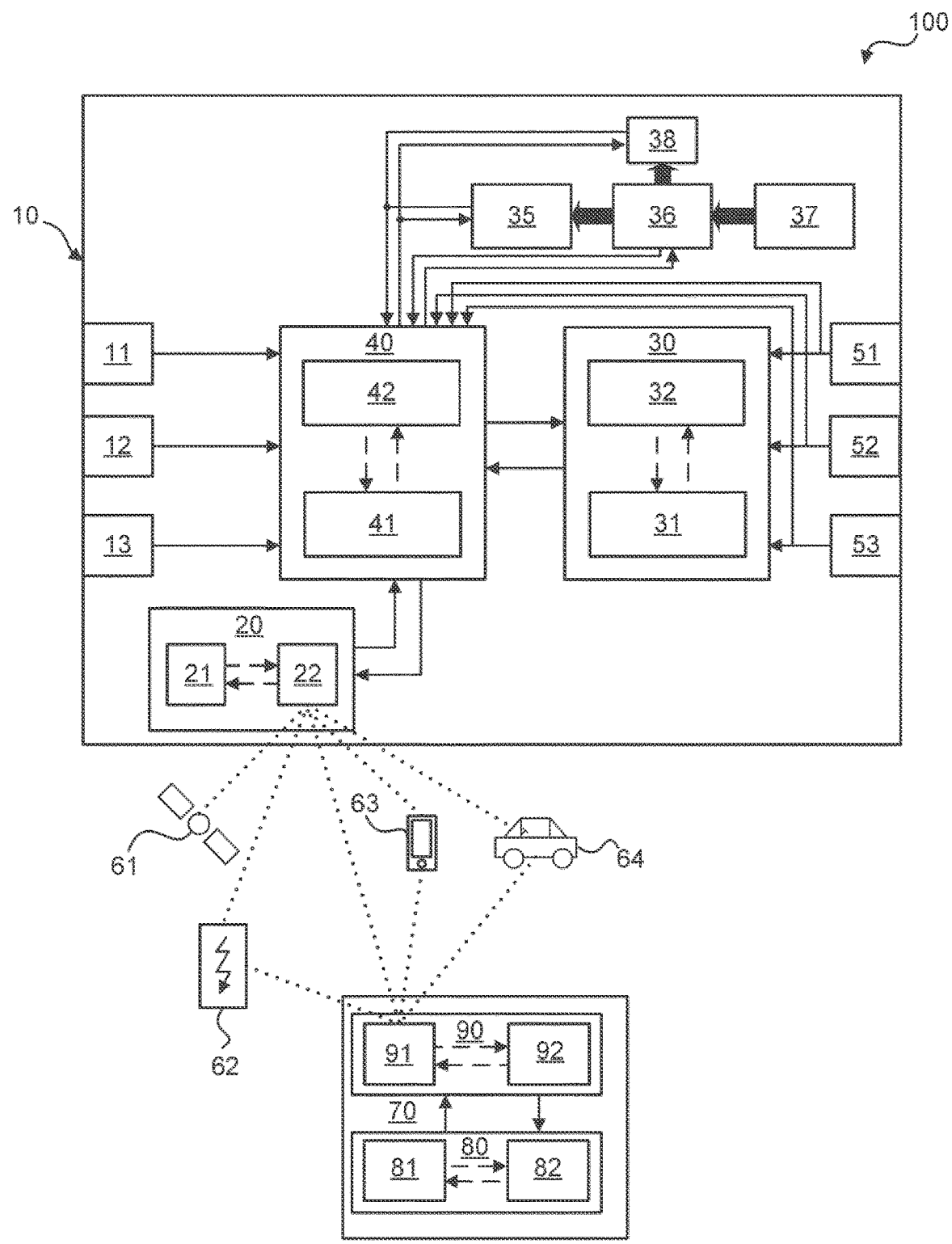
FIG. 1 shows a schematic and exemplary diagram of a system with a vehicle and a network server according to an embodiment.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A first exemplary aspect relates to a method of a vehicle for maintenance of vehicle components, especially of vehicle components installed in the vehicle itself. In the method, first the operating points of a plurality of vehicle components are captured over a first time period $\Delta t_1$. The operating point of a vehicle component is characterized here by the voltage tapped by the vehicle component and/or by the current tapped by the vehicle component. The operating point of a vehicle component therefore also characterizes the power consumption of the vehicle component. The operating point of a vehicle component is indicative of an operating state of the vehicle component and enables inferences about its condition.

Based on the operating states of the operating points captured over the first time period $\Delta t_1$, a first development of the plurality of operating points over time in the first time period $\Delta t_1$ is determined. The development of the operating points of a vehicle component over time may be determined in various ways, such as by storing the discrete values of the captured time series of the operating points and by determining the deviations between successive time points or measured points. In addition to such a discrete determination of a development over time, this may also be determined by fitting a functional relationship to the captured time series of the operating points and by forming a first chronological derivation of the functional relationship. In a simple embodiment, the functional relationship is a linear regression.

In the method according to the present aspect, operating points of the plurality of vehicle components are further captured over a second time period $\Delta t_2$, whereby the second time period is different than the first time period $\Delta t_1$ and especially, succeeds the first time period $\Delta t_1$. Based on the operating points captured in the second time period $\Delta t_2$, a second development of the plurality of operating points over time is determined in the second time period $\Delta t_2$. Similarly, the second development over time may for example be ascertained at discrete intervals or continuously, as described in the preceding. In the method, therefore, there are respective base values for the operating points of the vehicle components for at least two time periods and respectively derived characteristic values for the development of the operating points of the vehicle components over time. These values are for example stored in a control unit or a memory of the vehicle.

In the method according to the present aspect, a comparison is performed of the determined first development of the plurality of vehicle components over time and the determined second development of the operating points of the plurality of vehicle components over time. The specific performance of this comparison for example occurs as dependent upon the form of representation selected for the development over time. In a representation of the development over time as discrete intervals, for example, the mean deviation of the operating points between two measuring points, separated by a time interval, of the first time period $\Delta t_1$ may be compared to the mean deviation of the operating points between two measuring points of the second time period $\Delta t_2$ that are separated by an equal time interval. Alternatively, in a continuous representation of the development over time, the rise of the first time derivative of the functional relationship in the first time period may be compared to the rise in the first time derivative of the functional relationship in the second time period. Alternatively for example, a functional relationship for the total time period $\Delta t_1 + \Delta t_2$ is determined, for example a non-linear relationship, such as by a polynomial regression, and a second time derivative of the functional relationship is determined. A local extremum of the functional relationship of the development of the operating points over time in the total time period may then be used for the comparison of the first and the second development over time.

Furthermore, in the method according to the present aspect, an error message is output regarding a vehicle component for which the second development of its operating point over time deviates from the first development of said operating point over time by more than a predefined limit value. In other words, an error message is output regarding such a vehicle component for which the development of the operating points over time in the second time period significantly deviates from the development of the operating points over time in the first time period. The significance of the deviation is bound to the predefined limit value, whereby the latter may have different content depending on the form in which the development over time is represented.

The method according to the present aspect enables a monitoring of the operating states of vehicle components, which beneficially does not involve strictly the parameters characterizing the various operating states, but rather, considers the development of these system parameters over time, depicted in the development of the operating points over time. The method according to the present aspect thus makes it possible to separate a normal variance over time of the operating points (states) of vehicle components from an abnormal variance over time, whereby the latter indicates an error state of the components. Therefore, in the method according to the present aspect, both effects of normal age-related deterioration of the components as well as the effects of changing environmental conditions are implicitly captured. For example, normal age-related deterioration may result in an unproblematic drift of the operating points, which are captured as the first development of the operating points over time. An error is only detected once the second development over time significantly deviates from this drift.

In some embodiments, the operating points of all vehicle components are captured by a power distribution unit installed in the vehicle. The power distribution unit is for example an electronically controlled power distribution unit (ePDU—electronic power distribution unit). Such power distribution units are based on semiconductor fuses and are increasingly used in on-board electrical systems of vehicles to locally exploit their added-value functions. The power distribution unit is for example arranged in circuit between an energy source, for example, a battery system, and at least one vehicle component. The power distribution unit for example has an input connected to the energy source and a plurality of outputs connected to the vehicle components. The power distribution unit controls the power distribution to the various outputs with a plurality of semiconductor switches, especially semiconductor switches constituted from power transistors.

The power distribution unit is therefore designed for realizing switching and relay functions. Furthermore, the power distribution unit is designed to measure, for each output, the voltage assigned to that output and the current assigned to that output. The power distribution unit is furthermore designed to transmit the current and voltage measured values to a control unit for determining the power consumption of the vehicle components connected to the outputs. Alternatively, the power distribution unit itself is designed for determining the power consumption of the individual vehicle components. In these embodiments, the monitoring of all vehicle components electrically supplied via the power distribution unit is done centrally via the power distribution unit. Thus the use of self-diagnosing components may be dispensed with, which reduces the vehicle's costs and installation space requirement.

One exemplary aspect therefore also relates to the beneficial use of such a power distribution unit for maintenance of a plurality of vehicle components, especially in the method according first exemplary aspect, as described in the preceding. The power distribution unit according to some embodiments then performs all steps of the method according to the first aspect. Alternatively, the power distribution unit only captures the operating points, while conversely the determination of the development over time as well as the output of the error message are performed by a central control unit of the vehicle.

As described in the preceding, the first development of the operating points over time is intended to characterize typical or normal operating states, such that the deviation of the development over time in the second time period indicates an atypical or abnormal operating state. This is ensured in the method by a strategic selection of the first time period $\Delta t_1$. In some embodiments, the first time period $\Delta t_1$ comprises a test operation of the vehicle on a test bench, especially on a test bench of the vehicle manufacturer, of a dealer or of an affiliated service partner. In other words, a first development is captured for every vehicle component over time, especially while simultaneously capturing the operating state and/or the environmental conditions of the vehicle component. Thus, a normal development of the operating points over time, at least for defined environmental conditions, is captured. In these embodiments, the method according to the provides for example a normalization of the second development over time, based on the environmental conditions prevailing in the second time period.

Similarly, it is for example possible for the first time period $\Delta t_1$ to have a predefined number of initial route kilometers traveled by the vehicle or the time required to travel these route kilometers. In this manner, an initial operation of the vehicle is used to create a data basis that is used to determine the first development over time used in the method according to the first exemplary aspect. The captured operating points may be explicitly stored in corresponding data fields or implicitly stored by adjusting the coefficient of a self-learning neural network. The method according to the first exemplary aspect may therefore also be implemented by using an artificial intelligence or machine learning. The same applies to the previously described test operation.

In some embodiments mentioned in the preceding, it is beneficial for the captured operating points of the first time period $\Delta t1$ to indicate with a high degree of certainty a normal operating state of the vehicle components. A highly sensitive monitoring of the vehicle components may thus be realized. Similarly, it is for example possible for the first time period, however, to be a sliding time period that, at least in sections, extends over large parts of the vehicle service life or even the entire vehicle service life. In other words, a continuous adjustment of the first development over time is performed, such as, beneficially, to represent the normal effects of age-related deterioration especially precisely.

In some embodiments, the first time period $\Delta t_1$ comprises a past operation of the vehicle and illustrates the first development of the operating points over time for the past operation of the vehicle. The past operation of the vehicle may for example be defined as a time period that ended a predefined interval before the current point in time. In other words, the past operation of the vehicle always ended a predefined amount of time before a current point in time. In these embodiments, the second time period $\Delta t_2$ comprises a current ongoing operation of the vehicle and represents the second development of the operating points over time for the current operation of the vehicle. In these embodiments, the currently ongoing operation is defined as the predefined time interval before the current point in time, and as such, equally as a sliding time window.

According to these embodiments, a capturing of the operating points is performed in an ongoing continuous manner or at discrete intervals, and similarly continuously or discretely, the first and second development are determined continuously over time for the sliding first and second time periods. In these embodiments, the entire dynamic of the operating points in the past vehicle service life is captured as a typical development of operating points for this vehicle. As such, especially the effects of age-related deterioration are depicted very precisely. In these embodiments as well, a correction of the developments over time and/or of the captured operating points is performed on the basis of also captured environmental conditions. For example, the power consumption or operating point of an air conditioning unit is scaled based on an exterior temperature of the vehicle.

In some embodiments, both the first time period $\Delta t_1$ as well as the second time period $\Delta t_2$ are determined as sliding time windows with variable start and end points. In other words, the first time period $\Delta t_1$ starts a predefined first time interval $\Delta t_{1,1}$ before the current point in time $t_a$ and ends a predefined second time interval $\Delta t_{1,2}$ before the current point in time. The first time period is therefore defined as the time period between $(t_a-\Delta t_{1,2})-(t_a-\Delta t_{1,1})$, therefore as $\Delta t_{1,1}-\Delta t_{1,2}$. In these embodiments, the second time period begins a predefined second time interval $\Delta t_{1,2}=\Delta t_{2,1}$ before the current point in time, i.e., at the point in time $(t_a-\Delta t_{1,2})$, and ends at the current point in time $t_a$. These embodiments enable an implicit illustration of changing environmental conditions by means of the sliding time window. Furthermore, a gradual age-related deterioration of the vehicle components is also implicitly depicted, since according to this embodiment a predefined limit value is only exceeded by the differential of the developments over time in the case of significant changes in the developments over time, whereas steady changes generally will not result in an error message.

Some embodiments provide a variable selection of the above-mentioned predefined time intervals. It is for example possible for a reselection of the first and second predefined time intervals to take place depending on the first development over time. In this way, for example, a current trend in the development over time is taken into account, possibly in light of prevailing environmental conditions. For example, a first time period $\Delta t_1$ is restarted when a gradual positive rise in an operating point (or power consumption) is replaced by a gradual negative rise in the operating point (power consumption), especially if this occurs in conjunction with a change in the environmental conditions. Thus, a power consumption of an air conditioning unit may rise with rising exterior temperatures and fall with falling exterior temperatures without this resulting in a fault operating state. By restarting the first time period at or shortly after the point in time of such a change in the long-term trend of the operating points (power consumption), a current trend is depicted and a premature triggering of an error message is avoided, such as due to a change in a gradual rise to a significant rise.

In some embodiments, a comparison or a scaling of the captured operating points and/or of the determined development over time are performed based on user settings for the respective vehicle component. For example, at constant exterior temperatures, a power consumption of an air conditioning unit tends to be higher the greater the temperature difference desired by the user is, compared to the exterior temperature. Obviously, therefore, a sudden rise in the power consumption may be triggered by a changed user preference, which is considered accordingly. The consideration of such user settings represents a simple programming task.

In some embodiments, only part of this takes place in the vehicle itself. In any case, the operating points in the first and second time period are captured in the vehicle, for example by means of the power distribution unit, as described in the preceding. Other partial steps of the method, such as the determination of the developments over time, the comparison and/or the output of the error message may also be for example outsourced to a network server, to reduce the load on local computing devices.

In these embodiments, it may be for example possible for the method to include the transmission to the network server of the captured operating points of the vehicle components, the developments over time of the operating points and/or of the comparison results. In these embodiments, it may be for example possible for the method to include the receiving of the developments over time based on the captured values from the network server, the comparison results determined by the network server and/or the error message output by the network server.

For example and even in the case that the method is performed locally, it includes the steps of transmitting the captured operating points, the determined developments over time and/or the determined error messages to a network server. This enables the network server, which for example is operated by a vehicle manufacturer or its service partner, to perform predictive maintenance. For example, when error messages are received from many vehicles, inferences may then be made regarding problems with a production series of vehicle components.

Another exemplary aspect relates to a vehicle, in particular a passenger vehicle, with an internal combustion engine, electric motor or hybrid motor for performing the steps of a vehicle in the method according to the first aspect. The vehicle has a plurality of vehicle components, especially a plurality of electrically operated vehicle components. The vehicle components are either vehicle components with their own intelligent control, such as an air conditioning unit, or also simpler vehicle components, such as a wiper motor. The specific design of the control units of the components is not decisive.

Furthermore, the vehicle has a power distribution unit (ePDU) configured to electrically supply at least one vehicle component. The power distribution unit is for example arranged in circuit between an energy source, such as a battery system, and at least one vehicle component. The power distribution unit for example has an input connected to the energy source and a plurality of outputs connected to the vehicle components. The power distribution unit controls and/or regulates the power distribution among the various outputs with a plurality of semiconductor switches, especially semiconductor switches made of power transistors, which are switched in circuit between the input and the outputs of the power distribution unit.

The power distribution unit is therefore designed for realizing switching and relay functions. Furthermore, the power distribution unit is designed to measure, for each output, the voltage and/or the current assigned to it. Therefore, the power distribution unit is designed to record and monitor the currents and/or voltages distributed to the various outputs, and for example, the electrical power assigned to the outputs. The power distribution unit is furthermore designed to transmit the current and voltage measured values to a control unit, so that the latter may determine the power consumption of the vehicle components connected to the outputs. Alternatively, the power distribution unit itself is designed for determining the power consumption of the individual vehicle components.

The vehicle according to the present aspect furthermore has a (first) communication module configured for communicating with a network server. The communication module is especially configured for communicating via an air interface, such as a cellular network (4G, 5G), Wi-Fi or the like. Further for example, the communication module is configured and designed for communicating with other vehicles, with a smart infrastructure and/or with mobile end stations of a user.

The vehicle furthermore has a control unit configured to perform the steps of the vehicle in the method according to the first aspect. The control unit is thus designed to perform the steps of the method according to the first aspect itself or to control other components of the vehicle to perform the steps. The control unit is for example designed to capture the operating points of the plurality of vehicle components over a first time period $\Delta t_1$ by means of the power distribution unit, and based on the captured values, to determine a first development of the plurality of operating points over time in the first time period $\Delta t_1$. The control unit is further designed to capture the operating points of the plurality of vehicle components over a second time period $\Delta t_2$ by means of the power distribution unit and, based on the captured values, to determine a second development of the plurality of operating points over time in the second time period $\Delta t_2$.

The control unit is further designed to compare the first development and the second development of the operating points of the plurality of vehicle components over time and output an error message regarding a vehicle component if the second development of the operating point of said vehicle component over time deviates by more than a predefined limit value from the first development of the operating point of said vehicle component over time. Alternatively and for example, the control unit is designed to transmit to a network server by means of the communication module the captured operating points, the developments over time determined from them, the comparison results of the first and second development over time and/or the error message regarding a vehicle component. Similarly and for example, the control unit is designed to receive from the network server, by means of the communication module, the determined developments over time, comparison results regarding the determined developments over time and/or an error message regarding a vehicle component. In other words, other than the capturing of the operating points by the power distribution unit, the steps of the method according to the first exemplary aspect may also be performed in a distributed manner within a system having the vehicle and a network server.

Another exemplary aspect relates to a method of a control unit of a vehicle that has a power distribution unit (ePDU) configured for electrically supplying at least one vehicle component, a (first) communication module configured for communicating with a network server, and a control unit, wherein the method has at least the following steps: capturing operating points from a plurality of vehicle components over a first time period $\Delta t_1$ and determining a first development of the plurality of operating points over time in the first time period $\Delta t_1$, capturing operating points from the plurality of vehicle components of a vehicle over a second time period $\Delta t_2$ and determining a second development of the plurality of operating points over time in the second time period $\Delta t_2$, comparing the first development and the second development of the operating points of the plurality of vehicle components over time, and outputting an error message regarding a vehicle component, the second development of the operating point of which over time deviates from the first development of said operating point over time by more than a predefined limit value. Another exemplary aspect relates to a computer program comprising commands, which upon execution of the program by a computer, such as a control unit of a vehicle, cause said vehicle to perform the above-mentioned steps of the method.

Another exemplary aspect relates to a network server, such as a network server of a vehicle manufacturer or of a service partner. The network server according to the present exemplary aspect has a (second) communication module configured for data communication with a plurality of vehicles and/or mobile end stations and a (second) control unit. The (second) control unit of the network server is configured to perform the steps of the network server in the method according to the present exemplary aspect. The second control unit is especially designed to perform the following steps: receiving operating points from a plurality of vehicle components of a vehicle over a first time period $\Delta t_1$ and determining a first development of the plurality of operating points over time in the first time period $\Delta t_1$, receiving operating points from the plurality of vehicle components of a vehicle over a second time period $\Delta t_2$ and determining a second development of the plurality of operating points over time in the second time period $\Delta t_2$, comparing the first development and the second development of the operating points of the plurality of vehicle components over time, and outputting an error message regarding a vehicle component, the second development of the operating point of which over time deviates from the first development of said operating point over time by more than a predefined limit value. Another exemplary aspect relates to a computer program comprising commands, which upon execution of the program by a computer, such as a control unit of a network server, cause said computer to perform the above-mentioned steps of the vehicle in the method.

Another exemplary aspect relates to a method of a network server for maintenance of vehicle components of one or more vehicles. The method of the network server has at least the following method steps: receiving operating points from a plurality of vehicle components of a vehicle over a first time period $\Delta t_1$ and determining a first development of the plurality of operating points over time in the first time period $\Delta t_1$, receiving operating points from the plurality of vehicle components of a vehicle over a second time period $\Delta t_2$ and determining a second development of the plurality of operating points over time in the second time period $\Delta t_2$, comparing the first development and the second development of the operating points of the plurality of vehicle components over time, outputting an error message regarding a vehicle component, the second development of the operating point of which over time deviates from the first development of said operating point over time by more than a predefined limit value. Alternatively and for example, the control unit of the network server is designed to receive from the vehicle, by means of the communication module, the developments over time determined by the vehicle on the basis of the captured operating points, the comparison results determined by the vehicle on the basis of said captured operating points of the first and second development over time and/or the error message regarding a vehicle component determined by the vehicle based on the comparison. Similarly and for example, the control unit is designed to transmit to the vehicle, by means of the communication module, the determined developments over time, the determined comparison results regarding the determined or received developments over time and/or a determined error message regarding a vehicle component.

The error message output in the method regarding at least one vehicle component is for example transmitted to the at least one vehicle in which the certain vehicle component is arranged, provided the error message was not output by the vehicle itself. Further and for example, the error message determined or received by the vehicle is output in the vehicle, such as via a screen of an infotainment system or by means of an error warning lamp. Also for example, the error message received or determined by the vehicle triggers shutoff of the vehicle component, provided it is not a critical vehicle component. For example, a rear windshield heater is switched off if an atypical change in its operating point is determined.

Alternatively or additionally, the error message is for example output by the vehicle or the network server to a mobile end station of a user of at least one vehicle. This is especially helpful for vehicle components that are active during standstill or during parking of the vehicle, such as the battery charging control or standstill climate control of the vehicles. In this way, a user who has activated an air conditioner for a pet remaining in the vehicle may be informed about a malfunction of the air conditioner, for example. Also for example, the error message determined by the vehicle is transmitted to the network server or its service partner. The information regarding the faulty operating state of the vehicle component is therefore further available to the operator of the network server or to its service partner for predictive maintenance. In this way, large numbers of impermissible or unsafe operating states of vehicle components in various vehicles may therefore be responded to with a concerted campaign, such as a technical service bulletin or recall.

Another exemplary aspect relates to a system having a network server as described in the preceding and a vehicle as described in the preceding. Beneficially, all method steps and aspects of the method may be realized in the system according to the present aspect. Some embodiments of the vehicle, of the network server, of the method of the network server, of the computer programs and of the systems, correspond to the embodiments explained in the preceding with regard to the method.

The method steps of the method may be implemented by electrical or electronic parts or components (hardware), by firmware (ASIC), or achieved by executing a suitable program (software). Also for example, the method is achieved or respectively implemented by a combination of hardware, firmware, and/or software. For example, individual components for carrying out individual method steps are designed as a separately integrated circuit or arranged on a joint integrated circuit. Individual components configured to perform individual method steps are furthermore for example arranged on a (flexible) printed circuit board (FPCB/PCB), a tape carrier package (TCP), or another substrate.

The individual method steps of the method are further for example designed as one or more processes that run on one or more processors in one or more electronic computing devices and are created when executing one or more computer programs. The computing devices are for example designed to be interoperable with other components, such as a communication module, and possibly one or more sensors, to realize the functionalities described herein. The instructions of the computer programs are for example stored in a memory such as for example a RAM element. The computer programs may however also be stored on a non-volatile storage medium such as for example a CD ROM, a flash memory, or the like.

A person skilled in the art will see that the functionalities of multiple computers (data processing devices) may be combined or may be combined in a single device or that the functionality of a specific data processing device may be distributed on a plurality of devices to execute the steps of the method without deviating from the method.

The various embodiments mentioned in this application may beneficially be combined with one another, unless provided otherwise in individual cases.

The invention will now be explained in further exemplary embodiments below based on the associated drawings.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a schematic diagram of a system 100 from a vehicle 10 which communicates with a network server 70. Reference numeral 10 refers to a block diagram of an exemplary vehicle 10, especially a vehicle with two sets of parallel wheels with a combustion engine, electric motor or hybrid drive. The vehicle 10 comprises a plurality of first sensors, especially a first sensor 11, a second sensor 12 and a third sensor 13. The first sensors 11, 12, 13 are configured for capturing environmental data of the vehicle 10 and comprise, for example, a camera for capturing an image of an environment immediately surrounding the vehicle 10, distance sensors, such as ultrasound sensors or LIDAR for capturing relative distances from the vehicle 10 to surrounding objects. The first sensors 11, 12, 13 transmit the environmental signals captured by them to a first control unit 40 and to a driving system 30 of the vehicle 10.

The vehicle 10 further has a plurality of second sensors, especially a fourth sensor 51, a fifth sensor 52, and a sixth sensor 53. The second sensors 51, 52, 53 are sensors for capturing status data relating to the vehicle 10 itself, such as current position and motion information of the vehicle 10. The second sensors are consequently for example speed sensors, acceleration sensors, inclination sensors, sensors for measuring a compression depth of a shock absorber, wheel speed sensors, or the like. The second sensors 51, 52, 53 transmit the status signals captured by them to the first control unit 40 of the vehicle 10. Moreover, the second sensors 51, 52, 53 transmit their measurement results directly to a driving system 30 of the vehicle 10.

The vehicle 10 further has a first communication module 20 with a memory 21 and one or more transponders or transceivers 22. The transponder(s) 22 are radio, Wi-Fi, GPS or Bluetooth transceivers or the like. The transponder 22 communicates with the internal memory 21 of the first communication module 20, such as via a suitable data bus. The first communication module 20 also communicates with the first control unit 40. Moreover, the first communication module 20 is configured for communicating with a mobile network server 70, especially a backend server of a vehicle manufacturer or its service partner.

The first communication module 20 is further configured for communicating with a vehicle 64 that has an equivalent design to the vehicle 10. The communication module 20 is further configured for communicating with a mobile end station 63 and with an electric charging station 62. The communication takes place especially via a wireless interface, such as via Wi-Fi, a cellular network (4G or 5G) vehicle-to-vehicle communication and the like.

The vehicle 10 further has the driving system 30, which is configured for fully automated driving operation, especially for longitudinal and transverse guidance, of the vehicle 10. The driving system 30 has a navigation module 32 configured for calculating routes between a start point and a destination point and for determining the maneuvers to be performed by the vehicle 10 along this route. The navigation module 32 may for example be designed for performing specific maneuvers of the vehicle 10, such as maneuvers to enter a parking space and exit a parking space. Moreover, the driving system 30 comprises an internal memory 31 that communicates with the navigation module 32, via a suitable data bus, for example. The functionality of the driving system 30 is controlled by the control unit 40.

The vehicle 10 further has a first control unit 40 configured for performing the steps of the vehicle 10. The control unit 40 performs the steps itself or controls the other components of the vehicle 10 accordingly. For this purpose, the second control unit 40 has an internal memory 41 and a CPU 42 that communicate with one another, such as by a suitable data bus, for example. Moreover, the first control unit 40 has a communication connection with at least the first sensors 11, 12, 13, the second sensors 51, 52, 53, the first communication module 20, the driving system 30, the vehicle components (rear windshield heater 35 and wiper motor 38) and the power distribution unit 36, via one or more respective CAN connections, or more respective SPI connections, or other suitable data connections, for example.

The vehicle 10 further has a rear windshield heater 35 and a wiper motor 38 that are explained as exemplary vehicle components of the method in accordance with this embodiment. The rear windshield heater 35 and the wiper motor 38 are supplied with electrical energy by an energy store 37, as suggested by the black arrows in FIG. 1. The energy supply takes place via a power distribution unit (ePDU) 36 arranged in an on-board electric system between the energy store 37 and the rear windshield heater 35 as well as the wiper motor 38. The power distribution unit 36 measures data on the power consumption of the rear windshield heater 35 and of the wiper motor 35, especially regarding the electrical voltages and currents supplied to these vehicle components 35, 38.

The power distribution unit 36 communicates with the control unit 40, especially by transmitting to the control unit 40 data about the vehicle components, especially regarding their power consumption. Furthermore, the function of the rear windshield heater 35 and the power distribution unit 36 respectively take place under the control of the control unit 40, insofar as the control unit 40 transmits the necessary control signals respectively to the rear windshield heater 35 and the wiper motor 38, and to the power distribution unit 36.

The network server 70 has a second control unit 80 configured for performing the steps of the network server 70. For this purpose, the second control unit 80 has an internal memory 81 and a CPU 82 that communicate with one another, such as by a suitable data bus, for example. The network server 70 further has a second communication module 90. The second communication module 90 has a memory 92 and one or more transponders or transceivers 91. The transponder(s) 91 are radio, Wi-Fi, GPS or Bluetooth transceivers or the like. The transponder 91 communicates with the internal memory 92 of the second communication module 90, such as via a suitable data bus. For example, the second communication module 90 is configured to communicate via a 4G/5G cellular network.

The charging station 62 and the mobile end station 63, respectively, also have a third and a fourth communication module, and respectively have a third and a fourth memory unit and are in communication connection with the network server 70 and the vehicle 10. The charging station 62 further has means for charging the energy store 37 of the electric vehicle 10. The charging station 62 is for example connected to an energy source or an energy store, for example to a power grid.

Figure 2:
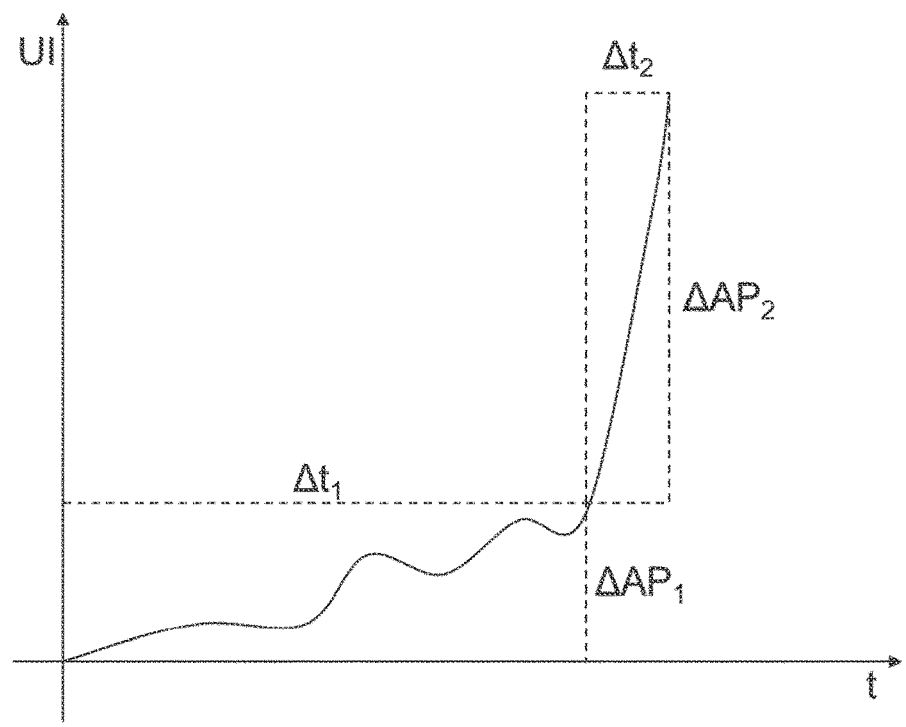
FIG. 2 shows a schematic and exemplary diagram of the development of the operating point of a vehicle component over time.
Figure 3:
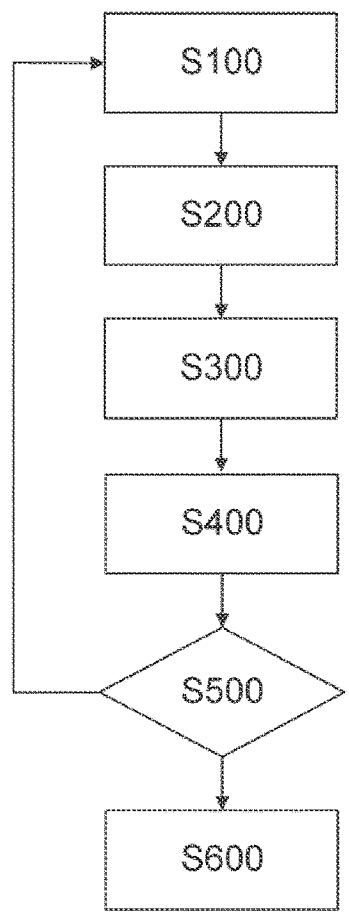
FIG. 3 shows a process diagram of a method performed in the system according to an embodiment.

FIG. 2 shows a schematic diagram of the development of the operating point of a vehicle component over time, especially of a rear windshield heater 35 of a vehicle 10, as described in relation to FIG. 1. As shown in the diagram in FIG. 2, the operating point is characterized by the voltage consumed by the respective vehicle component 35, 38 and/or by the current consumed by the respective vehicle component 35, 38, therefore also by the product of V*I. In the following, the development of the operating point of the rear windshield heater 35 over time shown in FIG. 2 is explained with reference to the schematic diagram of the method shown in FIG. 3.

As further shown in FIG. 2, the operating point of the rear windshield heater 35 varies over time, although in FIG. 2 the curve of an operating point of a rear windshield 35 normalized for environmental conditions and user settings is shown. In other words, the diagram shows the operating point curve of the rear windshield heater 35 at constant environmental conditions and unchanged user settings. Therefore, in principle, an operating point that remains constant over time should be expected.

Instead, however, the capturing of the operating points of the rear windshield heater 35 in a first method step S100 shows a continuous rise of the operating point, and the power consumption with it, of the rear windshield heater 35 in a first time period $\Delta t_1$. As shown by a determination, performed in step S200, of a first development of the operating point of the rear windshield heater 35 over time in a first time period $\Delta t_1$, the operating point changes during the first time period $\Delta t_1$ by a total difference $\Delta AP_1$. A first development of the operating point of the rear windshield heater 35 over time is therefore characterized by the first difference quotient $\Delta AP_1/\Delta t_1$. It characterizes a typical or normal rise of the operating point, which is conditioned by metallurgic changes in the heating wires of the rear windshield heater 35 or by changes in the cross-section surface of the heating wires caused by damage.

The capturing of the operating points of the rear windshield heater 35 in a second time period $\Delta t_2$ following the first time period $\Delta t_1$ in method step S300 shows a drastic rise of the operating point of the rear windshield heater 35. The second time period $\Delta t_2$ relates to a current operation of the rear windshield heater 35, especially a time window of 30$s$ before a current time $t_a$. The first time period $\Delta t_1$ comprises at least parts of the operating duration of the rear windshield heater 35 that occurred before this time window $\Delta t_2$. A determination of a second development of the operating point of the rear windshield heater 35 over time in step S400 makes apparent that the operating point, and the power consumption with it, rises in the second time period $\Delta t_2$ by the difference $\Delta AP_2$. Therefore, the second development of the operating point over time is equivalent to the second difference quotient $\Delta AP_2/\Delta t_2$.

As is apparent from FIG. 2, the second difference quotient $\Delta AP_2/\Delta t_2$ is significantly greater than the first difference quotient $\Delta AP_1/\Delta t_1$ and especially deviates from the first difference quotient by more than a predefined limit value. This results from a comparison performed in step S500 of the first and second development over time. The predefined limit value in this example is defined by a maximum factor by which the second difference quotient is permitted to exceed the first difference quotient. In the case shown, this factor is equal to three, whereas the second difference quotient $\Delta AP_2/\Delta t_2$ is approximately ten times greater than the first difference quotient $\Delta AP_1/\Delta t_1$. Consequently, in the method for the case shown in FIG. 2, an error message is output regarding the rear windshield heater 35 in step S600.

If, conversely, it was determined in step S500 of the method that $(\Delta AP_2/\Delta t_2)/(\Delta AP_1/\Delta t_1)<3$, the method would again switch to step S100, wherein the operating points of the previously second time period $\Delta t_2$ are then considered for the first time period $\Delta t_1$ and the first development over time. Once 30 s have elapsed following the end of the previously second time period $\Delta t_2$, a measurement of operating points would once again occur in a then new, second time period $\Delta t_2$.

LIST OF REFERENCE NUMERALS

10 Vehicle
11 First sensor
12 Second sensor
13 Third sensor
20 Communication module
21 Memory
22 Transponder
30 Driving system
31 Memory
32 Navigation module
35 Rear windshield heater
36 Power distribution unit
37 Electric energy store (battery system)
38 Wiper motor
40 Control unit
41 Memory
42 CPU
51 Fourth sensor
52 Fifth sensor
53 Sixth sensor
61 Satellite
62 Charging station
63 Mobile end station (smartphone)
70 Network server
80 Control unit
81 Memory
82 CPU
90 Communication module
91 Transponder
92 Memory
100 System The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A vehicle comprising:
 a plurality of vehicle components,
 a power distribution unit configured to control a plurality of semiconductor switches to control an electrical supply for each of the plurality of vehicle components, the power distribution unit further configured for measuring at least one of an assigned voltage and an assigned current of each of the plurality of vehicle components,
a communication interface configured for communicating with a network server, and
a control unit in signal communication with the power distribution unit and the communication interface,
wherein the control unit comprises a processor communicating with a memory comprising instructions that, when executed, configure the processor for:
capturing a first plurality of operating points, including at least one of the assigned voltage, the assigned current, and a power consumption, for each of the plurality of vehicle components over a first time period $\Delta t_1$ using the power distribution unit and scaling the first plurality of operating points based on a sensed exterior temperature of the vehicle corresponding to the first time period;
capturing a second plurality of operating points, including at least one of the assigned voltage, the assigned current, and the power consumption, for each of the plurality of vehicle components over a second time period $\Delta t_2$ using the power distribution unit and scaling the second plurality of operating points based on a sensed exterior temperature of the vehicle corresponding to the second time period; and
outputting an error message regarding a vehicle component for which a second development over time of the scaled second plurality of operating points, including at least one of the assigned voltage, the assigned current, and the power consumption of a vehicle component, deviates from a first development over time of the scaled first plurality of operating points, including at least one of the assigned voltage, the assigned current, and the power consumption of the vehicle component, by more than a predefined limit value.

2. The vehicle of claim 1, wherein the power distribution unit has an input connected to an energy store, a plurality of outputs connected to vehicle components and a plurality of semiconductor switches arranged in circuit between the input and the outputs and is designed for capturing and monitoring the currents and voltages distributed at the individual outputs.

3. The vehicle of claim 1, wherein the first time period $\Delta t_1$ comprises one or more of a test operation of the vehicle and a predefined number of initial route kilometers traveled by the vehicle.

4. The vehicle of claim 1, wherein the first time period $\Delta t_1$ comprises a past operation of the vehicle, the first development of the first plurality of operating points over time illustrates the past operation of the vehicle, the second time period $\Delta t_2$ comprises a currently ongoing operation of the vehicle and/or the second development of the second plurality of operating points over time illustrates the current operation of the vehicle.

5. The vehicle of claim 4, wherein the first time period $\Delta t_1$ comprises a past operation of the vehicle, the first development of the first plurality of operating points over time illustrates the past operation of the vehicle, the second time period $\Delta t_2$ comprises a currently ongoing operation of the vehicle and/or the second development of the second plurality of operating points over time illustrates the current operation of the vehicle.

6. The vehicle of claim 5, the memory comprising instructions that, when executed, configure the processor for: transmitting one or more of the captured first or second plurality of operating points of the vehicle components, the developments over time of the first or second plurality of operating points, and the error message to the network server.

7. The vehicle of claim 4, the memory comprising instructions that, when executed, configure the processor for: transmitting one or more of the captured first or second plurality of operating points of the vehicle components, the developments over time of the first or second plurality of operating points, and the error message to the network server.

8. The vehicle of claim 1, the memory comprising instructions that, when executed, configure the processor for: transmitting one or more of the captured first or second plurality of operating points of the vehicle components, the developments over time of the first or second plurality of operating points, and the error message to the network server.

9. The vehicle of claim 1, wherein the error message:
is transmitted to the vehicle, is output in the vehicle and/or triggers shutoff of the vehicle component;
is output to a mobile end station of a user of the vehicle; and/or
is transmitted to a service partner of an operator of the network server.

10. The vehicle of claim 1, wherein:
the power distribution unit is configured for determining the power consumption of each of the plurality of vehicle components; and
the first plurality of operating points includes the power consumption for each of the plurality of vehicle components over a first time period $\Delta t_1$; and
the second plurality of operating points includes the power consumption for each of the plurality of vehicle components over a second time period $\Delta t_2$.

11. The vehicle of claim 1, wherein:
the first developments over time is a first difference quotient of the first plurality of operating points; and
the second developments over time is a second difference quotient of the second plurality of operating points.

12. A network server comprising:
a communication interface configured for data communication with a plurality of vehicles, and
a control unit comprising a processor communicating with a memory comprising instructions that, when executed, configure the processor for:
receiving a first plurality of operating points, including at least one of an assigned voltage, an assigned current, and a power consumption, for each of a plurality of vehicle components of a vehicle over a first time period $\Delta t_1$ and scaling the first plurality of operating points based on a sensed exterior temperature of the vehicle corresponding to the first time period;
receiving a second plurality of operating points, including at least one of the assigned voltage, the assigned current, and the power consumption, for each of the plurality of vehicle components of a vehicle over a second time period $\Delta t_2$ and scaling the second plurality of operating points based on a sensed exterior temperature of the vehicle corresponding to the second time period; and
outputting an error message regarding a vehicle component for which a second development over time of the scaled second plurality of operating points, including at least one of the assigned voltage, the assigned current, and the power consumption of the vehicle component, deviates from a first development over time of the scaled first plurality of operating points, including at least one of the assigned voltage, the assigned current, and the power consumption of the vehicle component, by more than a predefined limit value.

13. The network server of claim 12, wherein:
the first plurality of operating points includes the power consumption for each of the plurality of vehicle components over a first time period $\Delta t_1$; and
the second plurality of operating points includes the power consumption for each of the plurality of vehicle components over a second time period $\Delta t_2$.

14. The network server of claim 12, wherein:
the first developments over time is a first difference quotient of the first plurality of operating points; and
the second developments over time is a second difference quotient of the second plurality of operating points.

15. The network server of claim 12, wherein the memory comprises further instructions that, when executed, configure the processor of the control unit for controlling predictive maintenance for the plurality of vehicles.

* * * * *